July 31, 1934.  K. HAMILTON  1,968,144
SKATING RINK
Filed Sept. 26, 1932    2 Sheets-Sheet 1
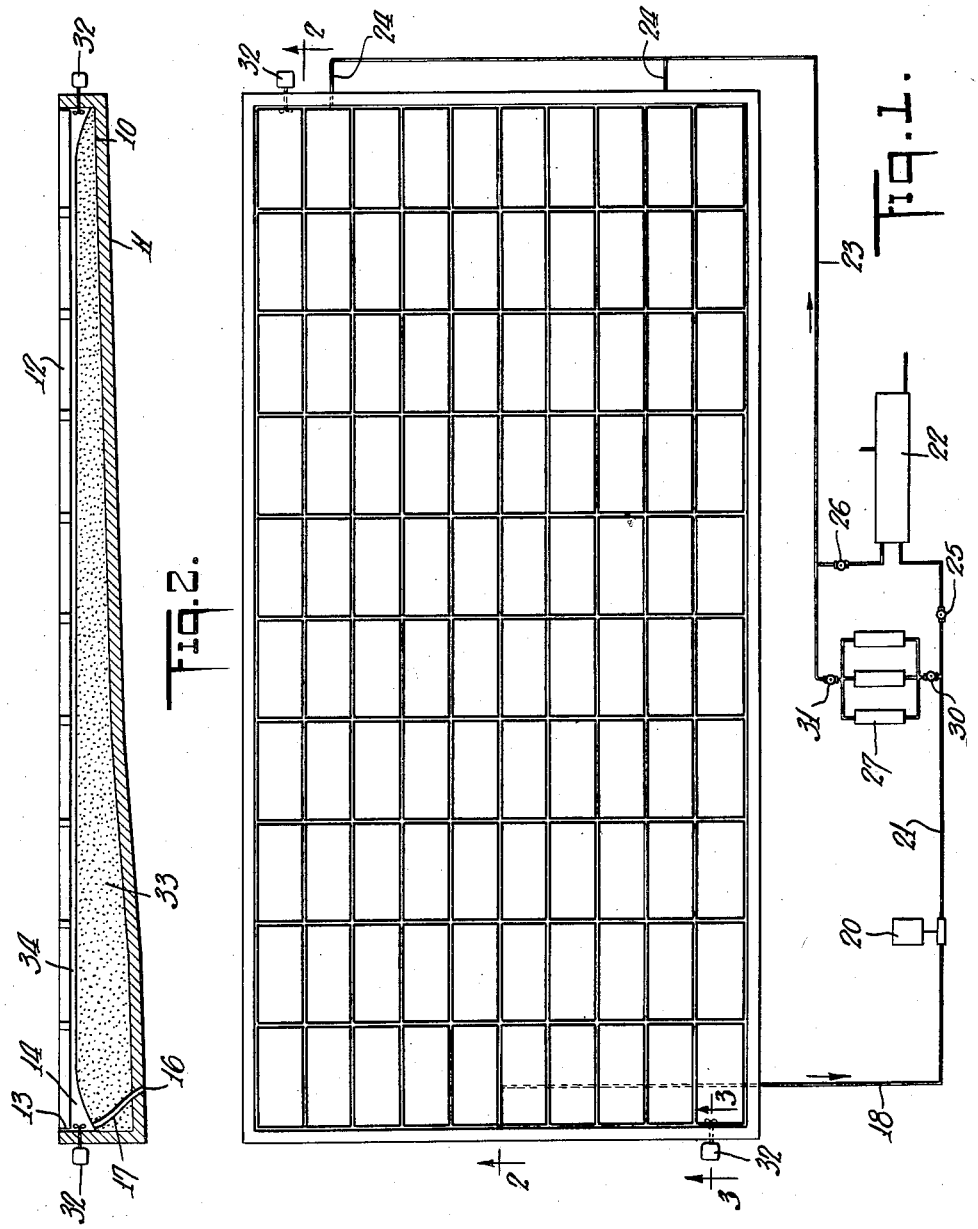
INVENTOR
Kenneth Hamilton
BY
ATTORNEYS

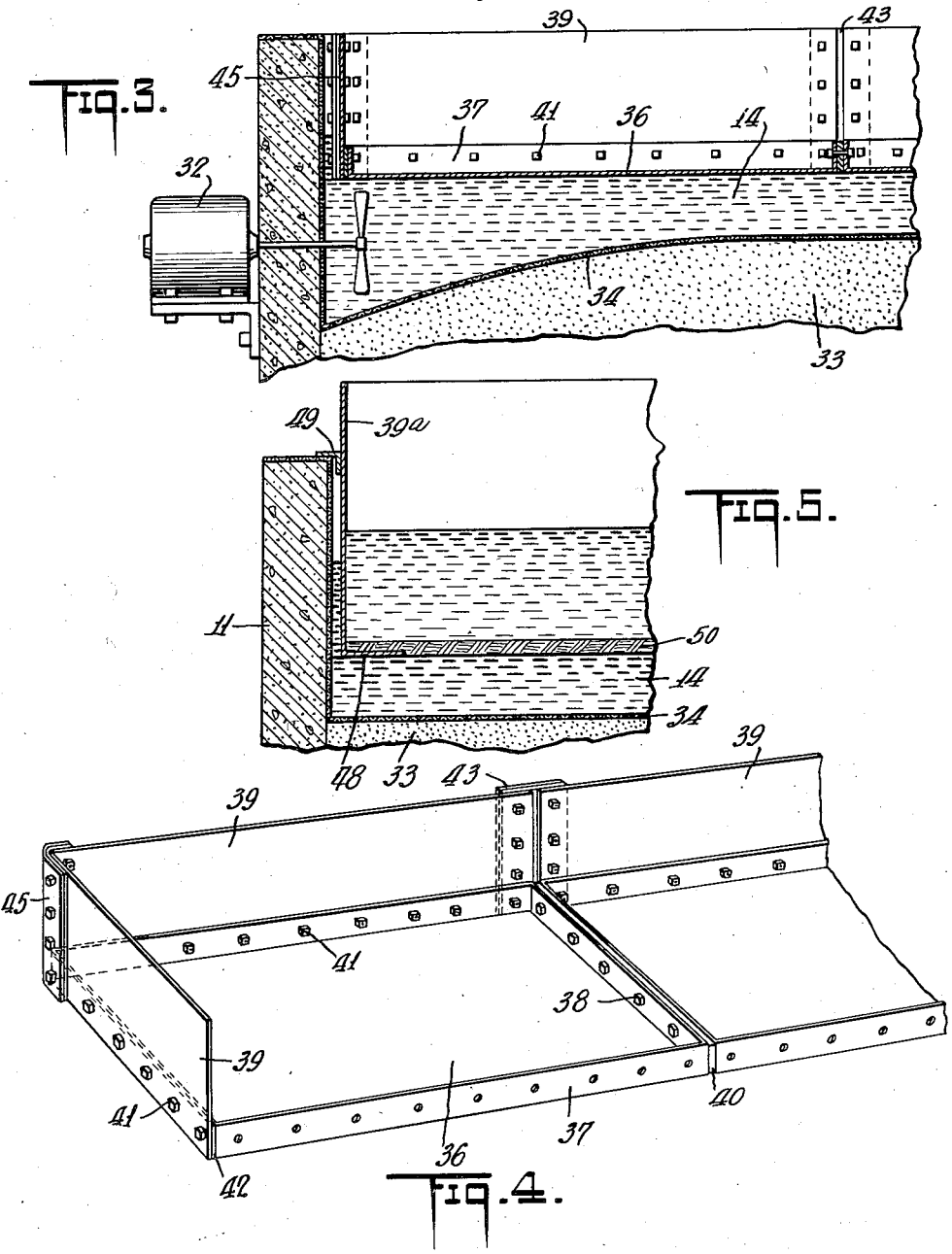

Patented July 31, 1934

1,968,144

UNITED STATES PATENT OFFICE 1,968,144

SKATING RINK

Kenneth Hamilton, New York, N. Y.

Application September 26, 1932, Serial No. 634,833

9 Claims. (Cl. 62—12)

In carrying out my invention there is provided a large shallow compartment adapted to contain a comparatively thin layer of water to be frozen and form the skating surface, and a lower compartment of very slightly larger size and adapted to contain brine or other liquid refrigerant. The brine serves a double function, that is, it serves to absorb heat through the partition between the compartments and thus freeze the water, and it serves as the support for the water, the container therefor and the ice.

As the water and its container merely float on the brine without additional load prior to freezing, it is not essential that the partition or membrane between the water and liquid refrigerant have any considerable structural strength. It is important that it be liquid tight. Thus, after the water is frozen the layer of ice may be the main or primary strength element in the floating parts supporting the live load resulting from skaters on the ice. As the side walls of the water compartment are closely adjacent to and enclosed by the side walls of the brine chamber, any slight depression of the floating body by the addition of a live load will be resisted by a relatively great rise in the brine level between the closely spaced peripheral walls and the floating body will remain substantially stationary, even under heavy and shifting load. The membrane between the liquids may be of thin metal, plain or corrugated, duck, canvas, tarpaulin, or other similar flexible material, or of wood or common forms of water tight flooring, or of waterproof concrete, or may be formed in place as by cooling a layer of paraffin, tar, or other material which is solid at normal temperatures, but readily liquefied.

As one important advantage of my improved construction the floating body does not carry any refrigerant conduit or circulating means, and therefore may be made and installed at very low cost, and may be assembled on the job, and of any size desired, by securing together the requisite number of light, cheap, sheet metal sections. It may be as easily removed and stored in a small compact form.

The lower compartment forming the liquid refrigerant chamber may be an ordinary swimming pool, and thus the floating body may be easily assembled from separate sections to fit the pool, regardless of the size of the latter. No changes need be made in the pool or the walls thereof. The water used for swimming in summer may be drained out and replaced by brine or other liquid refrigerant, and suitable means provided either in the pool or outside, for keeping the brine at the desired low temperature. The usual filling and emptying conduits may be used and connected up to the brine cooler and pump or other circulating means.

It is desirable that the bottom and sides of the pit be insulated so that cold brine coming in contact therewith does not freeze the moisture of the earth below and cause said bottom and sides to bulge. For that purpose I may build a false bottom of hollow tile in the pit, with cork insulation laid over it, and then the whole surfaced with concrete. In new pit constructions this insulation may be put on the outside of the pit adjoining the bottom and sides thereof.

A simple, inexpensive and very effective way of insulating the bottom and sides of the pit is to fill the pool with sand up to the required level, to make a good insulating surface and reduce the space for the brine to the desired minimum. This involves practically no cost, in cases where sand lots are provided for the bathers to use when not in the pool. In the winter when it is desired to use the pit for a skating rink, this sand may be used to fill up the pool. This sand also serves to reduce the amount of brine in the pit, and may be made high enough to prevent the pan from accidentally sinking to a depth which would bring brine above the ice. This sand layer may be also made high enough so as to insulate a substantial part of the sides of the pit.

In order to prevent the cold brine seeping to an undue extent into the sand, to prevent the sand from being stirred up by any rapid circulation of the brine, and to prevent the sand from being diffused into the cold brine, I preferably use a layer of gravel, building paper, cloth, metal or wood over the sand.

At the end of the skating season the floating body and the sand may be removed from the pit and the sand replaced in the sand lot until the start of the next skating season. The pan may then be separated into sections and stored away. By means of my invention a swimming pool may be converted into a skating rink very easily, quickly, and at low cost.

In the accompanying drawings there are shown for purposes of illustration certain constructions embodying my invention. In these drawings:

Fig. 1 is a top plan view somewhat diagrammatically showing one embodiment.

Fig. 2 is a section taken on the line 2—2 of Fig. 1.

Fig. 3 is a section taken on the line 3—3 of Fig. 1, and on a larger scale.

Fig. 4 is a perspective showing certain of the pan sections, and

Fig. 5 is a section similar to a part of Fig. 4, but showing a different form.

In one specific embodiment of the present invention there is shown in Figs. 1 to 4, a pit 10 which may be of the usual construction for use as a swimming pool, and which has a concrete lining 11 and a sloping floor, so that one end of the pool is deep enough to swim in, while the other end is shallow for the bathers who cannot or may not care to swim.

By means of my invention the pit may be converted into a skating rink for winter use, or if enclosed, for use at any time. For that purpose there is provided a floating floor 12 in the form of a pan extending across substantially the entire area of the pit 10, and having side walls 13 high enough to permit the pan to float when loaded with the required amount of water and the skaters, and also high enough to provide against overflow of the brine in case of excessive concentration of skaters at one edge of the pan. For that purpose, the side walls 13 of the pan may be about 12 to 20 inches high.

As an important feature of the present invention the pan is floated in cold brine 14 in the pit 10, a suitable brine circulating and cooling system being provided for maintaining said brine cold enough to freeze a layer of water in the pan to form an ice skating surface.

The means for circulating cold brine in the pit 10 may be of any suitable construction. In the form shown, the bottom of the pit 10 is provided with the usual drain opening 16 at the low point for water, and to this is connected an outlet pipe 18 leading to the inlet of a pump 20. The outlet of the pump 20 has a connection 21 leading to the inlet of a suitable brine cooler 22, the outlet of which is provided with a connection 23 having branch connections 24 leading into the brine 14 at the other end of the pit. The inlet and outlet of the brine cooler 22 are provided with valves 25 and 26 respectively, and any suitable refrigeration system may be provided for cooling the brine in the brine cooler.

The cold brine circulating system may include portions of the circulating system for the swimming pool water, and may be constructed by adding the brine cooler 22 to the existing circulating system. As shown, the circulating system for the swimming pool water includes a filter or purifier 27. The inlet and outlet of this filter are controlled by inlet and outlet valves 30 and 31 respectively, and are connected in parallel with the brine cooler 22 so that either the cooler or the filter may be shut down according to whether it is desired to use the pit as a swimming pool or as a skating rink. Suitable agitators 32 may be provided at the ends of the pit 10 for maintaining a circulation of brine in said pit. These may be rotary screws, propellers, or paddles driven by electric motors or in any other suitable manner.

In order to protect the earth surrounding the pit 10 from freezing and causing the bottom and sides of the pit to bulge, and to reduce the volume of brine in circulation, I preferably fill the pit, if it be a swimming pool, with suitable insulating material. As shown the pit is filled with sand 33 up to the required level to make a good insulating surface, and to leave only a small space for the brine so as to cut down the amount of brine necessary. It may be made high enough so that the pan could not accidentally sink or tilt to any considerable extent. The use of sand as an insulating material is particularly advantageous in cases where a sand lot is provided for the bathers to disport themselves in when not in the pool.

In order to prevent intermixing of sand and the brine, the top surface of the sand is preferably covered with some suitable waterproof material, such as the cloth sheet 34 having the edges thereof detachably fastened to the sides of the pit, as for instance by extending up between the pan walls and the pit walls and over the edges of the latter.

The pan 12 may be built of a construction which will permit it to rest on the bottom of the pit in the summer and form the floor of the swimming pool. However, it is advantageous that the pan be removed entirely from the pit when it is desired to use the pit for a swimming pool. For that purpose, the pan may be formed of detachably connected metal sections, each section comprising a bottom plate 36 having upstanding flanges 37 along the edges thereof. The sections are connected together by bolts 38 passing through the flanges 37 of adjoining sections, or the flanges may be detachably fastened together by clips or any other suitable means. Suitable gaskets 40 are interposed between said flanges to render the joints formed watertight. The sections on the outside of the pan have plates 39 detachably connected to the flanges 37 at the outer sides by bolts 41, suitable gaskets 42 being provided between said flanges and said plates. Adjoining plates 39 in the same plane are connected together by strips 43, and the plates adjoining the corners of the pan are connected by angle pieces 45, suitable means being provided for rendering the joints watertight.

In the winter when it is desired to use the pit 10 for a skating rink, the water which has been used for swimming purposes is drained out, a pipe 17 attached to the drain opening 16, and the sand from the sand lot adjoining the pit moved into the pit up to the desired height. The pipe 17 extends above the sand into the brine space. The sand is then covered with the cloth sheet 34 or other watertight layer, and the pan sections are assembled and placed on the same. The filter 27 is cut out of circuit, and the brine cooler 22 is cut in. The brine is admitted and the circulating system is started. The pan will float on the cold brine. The pan may be filled with water to a depth of about three or four inches and will be frozen to form an ice skating surface.

When the water has become frozen to the required thickness it will constitute the main strength element, and therefore it is not essential that the floating pan be of strength other than that required to hold the water in place during the freezing.

A very simple and less expensive construction is that illustrated in Fig. 5. In this form there is provided merely a peripheral wall 39a of thin sheet metal and disposed adjacent to and preferably substantially parallel with the wall 11 of the brine chamber. The peripheral wall 39a has an inwardly extending flange 48 at its lower edge, and means such as brackets 49 provided for temporarily supporting the peripheral wall so that this flange will lie in the plane of the surface of the brine in the brine chamber. Melted paraffin, wax, tar, or any other similar material which is readily meltable and which is solid at ordinary temperatures may be used. This is poured in liquid form so that it floats on the brine 14 and forms a layer or membrane 50 covering the brine and engaging the flange 48 and the peripheral wall 39a. After the liquid has solidified, it, together with the peripheral wall 39a, forms the water compartment. Water is admitted to this compartment, but as the membrane 50 merely lies between the two layers of liquid it is not subjected to any strain tending to rupture it. Additional brine may be admitted below the membrane at the same time that the water is admitted above, or is admitted afterwards so as to float the pan and water to a slightly higher elevation and bring the brackets 49 out of engagement with the tank wall. The brackets might be removed and thus permit the pan and the contained water or brine to descend to a slight extent with a corresponding rise of brine between the walls 39a and 11.

Having thus described my invention, what I claim as new and desire to secure by Letters Patent is:

1. A skating rink including a liquid refrigerant container having an open top, and a pan of an area nearly equal to that of said container floating on the refrigerant in said container and adapted to receive water to be frozen by said refrigerant to form the skating surface, said pan having side walls closely adjacent to the side walls of said container, whereby other than very slight tilting or lowering of said skating surface under live load is effectively prevented by substantial rise of said liquid refrigerant between said side walls.

2. A skating rink including a liquid refrigerant container having an open top, a pan of an area nearly equal to that of said container floating on the refrigerant in said container and adapted to receive water to be frozen by said refrigerant to form the skating surface, a refrigerating apparatus outside of said container, and means for circulating said liquid through said container and said apparatus, said pan having side walls closely adjacent to the side walls of said container, whereby other than very slight tilting or lowering of said skating surface under live load is effectively prevented by substantial rise of said liquid refrigerant between said side walls, the bottom wall of said pan being thin to permit rapid heat transfer from the water to the refrigerant.

3. A skating rink including a liquid refrigerant container having an open top, a pan of an area nearly equal to that of said container floating on the refrigerant in said container and adapted to receive water to be frozen by said refrigerant to form the skating surface, said pan having very low structural strength but reinforced by the ice formed therein, and having side walls closely adjacent to the side walls of said container, whereby other than very slight tilting or lowering of said skating surface under live load is effectively prevented by substantial rise of said liquid refrigerant between said side walls, the bottom wall of said pan being thin to permit rapid heat transfer from the water to the refrigerant.

4. A skating rink including a liquid refrigerant container having an open top, and a pan formed of a plurality of detachably connected sections, and of an area nearly equal to that of said container floating on the refrigerant in said container and adapted to receive water to be frozen by said refrigerant to form the skating surface, said pan having side walls closely adjacent to the side walls of said container, whereby other than very slight tilting or lowering of said skating surface under live load is effectively prevented by substantial rise of said liquid refrigerant between said side walls, the bottom wall of said pan being thin to permit rapid heat transfer from the water to the refrigerant.

5. A skating rink including a chamber adapted, when filled with water, to serve as a swimming pool, a layer of loose readily removable insulating material covering the bottom and filling said chamber to a substantial extent, a liquid refrigerant in said chamber above said material, means for preventing intermixing of said liquid and said material, and a shallow water container of substantially the same area as said chamber and floating on said refrigerant in said chamber.

6. A skating rink including a chamber adapted, when filled with water, to serve as a swimming pool, a layer of loose readily removable insulating material covering the bottom and filling said chamber to a substantial extent, a liquid refrigerant in said chamber above said material, a watertight, flexible partition between said liquid and said material, and a shallow water container of substantially the same area as said chamber and floating on said refrigerant in said chamber.

7. A skating rink including a chamber adapted, when filled with water, to serve as a swimming pool, a layer of loose sand covering the bottom and filling said chamber to a substantial extent, a liquid refrigerant in said chamber above said sand, a watertight, flexible partition between said liquid and said sand, and a shallow water container of substantially the same area as said chamber and floating on said refrigerant in said chamber.

8. A skating rink including a chamber adapted to serve as a swimming pool when filled with water, a layer of loose insulating material partially filling said chamber, a liquid tight membrane covering said material and extending substantially to the upper edges of the side walls of said chamber and adapted to retain a non-freezing liquid out of contact with said material, a shallow pan adapted to contain water and float on said liquid, and means for maintaining said liquid below the freezing temperature of the water to form and maintain a layer of ice in said pan to form a skating surface.

9. A skating rink including a chamber adapted to serve as a swimming pool when filled with water, a layer of loose insulating material partially filling said chamber, a liquid tight membrane covering said material and extending substantially to the upper edges of the side walls of said chamber and adapted to retain a non-freezing liquid out of contact with said material, a water container of approximately the area of said chamber and adapted to contain water and float on said liquid, and means for maintaining said liquid below the freezing temperature of the water to form and maintain a layer of ice in said pan to form a skating surface.

KENNETH HAMILTON.